(12) United States Patent
Georgiades et al.

(10) Patent No.: US 8,732,227 B2
(45) Date of Patent: May 20, 2014

(54) METHOD AND PROCESSOR UNIT FOR IMPLEMENTING A CHARACTERISTIC-2-MULTIPLICATION

(75) Inventors: Jean Georgiades, München (DE); Bernd Meyer, München (DE)

(73) Assignee: Siemens Aktiengesellschaft, Munich (DE)

( * ) Notice: Subject to any disclaimer, the term of this patent is extended or adjusted under 35 U.S.C. 154(b) by 557 days.

(21) Appl. No.: 13/055,218

(22) PCT Filed: May 22, 2009

(86) PCT No.: PCT/EP2009/056228
§ 371 (c)(1),
(2), (4) Date: Jan. 21, 2011

(87) PCT Pub. No.: WO2010/009917
PCT Pub. Date: Jan. 28, 2010

(65) Prior Publication Data
US 2011/0131395 A1    Jun. 2, 2011

(30) Foreign Application Priority Data
Jul. 21, 2008  (DE) .......................... 10 2008 033 962

(51) Int. Cl.
*G06F 7/52*    (2006.01)

(52) U.S. Cl.
USPC ........................................ 708/620; 712/221

(58) Field of Classification Search
None
See application file for complete search history.

(56) References Cited

U.S. PATENT DOCUMENTS

| | | | |
|---|---|---|---|
| 6,920,473 B2 | 7/2005 | Elbe et al. | 708/492 |
| 7,277,540 B1 | 10/2007 | Shiba et al. | 380/28 |
| 8,009,827 B2 | 8/2011 | Okochi et al. | 380/28 |
| 2007/0150794 A1 | 6/2007 | Naslund et al. | 714/781 |
| 2011/0131395 A1 | 6/2011 | Georgiades et al. | 712/221 |

FOREIGN PATENT DOCUMENTS

| | | | | |
|---|---|---|---|---|
| DE | 10107376 A1 | 8/2002 | | G06F 7/72 |
| JP | 2004519052 A | 6/2004 | | G06F 7/72 |
| JP | 2006517036 A | 7/2006 | | G06F 12/14 |
| JP | 2007228141 A | 9/2007 | | H04L 9/10 |
| WO | 2004/070510 A2 | 8/2004 | | G06F 12/14 |
| WO | 2010/009917 A1 | 1/2010 | | G06F 7/72 |

OTHER PUBLICATIONS

International PCT Search Report and Written Opinion, PCT/EP2009/056228, 16 pages, Aug. 27, 2009.
Japanese Office Action, Application No. 2011-519095, 13 pages (German), Feb. 4, 2013.

*Primary Examiner* — Michael D Yaary
(74) *Attorney, Agent, or Firm* — King & Spalding L.L.P.

(57) ABSTRACT

The method for implementing a characteristic-2-multiplication of at least two input bit strings each having a number N of bits by means of a processor unit suitable for carrying out an integer multiplication, having the following steps:
a) generating at least one sequence of a number K of zero bits, using K∈{1, . . . , N}, by means of a first transformation of the respective input bit string to at least one predetermined position in the respective input bit string for generating at least one first intermediate bit string;
b) linking the at least two first intermediate bit strings by means of the integer multiplication of the processor unit for generating at least one second intermediate bit string; and
c) transforming the at least one second intermediate bit string by means of a second transformation for generating a result bit string.

13 Claims, 4 Drawing Sheets r1    EB:    $(\overbrace{1011}^{EB1}) \cdot (\overbrace{1101}^{EB2})$ r2    Z1:    $(\overbrace{1}^{F}\,0\,0\,\overbrace{0}^{F}\,0\,0\,\overbrace{1}^{F}\,0\,0\,1)^{Z11} \cdot (\overbrace{1}^{F}\,0\,0\,\overbrace{1}^{F}\,0\,0\,\overbrace{0}^{F}\,0\,0\,1)^{Z12}$ r3    Z2:    $(1\,0\,0\,1\,0\,0\,1\,0\,1\,1\,0\,0\,1\,0\,0\,1\,0\,0\,1)^{Z2}$ r4    Z2:    $(1\,\cancel{0}\,\cancel{0}\,1\,\cancel{0}\,\cancel{0}\,1\,\cancel{0}\,1\,1\,\cancel{0}\,\cancel{0}\,1\,\cancel{0}\,\cancel{0}\,1\,\cancel{0}\,\cancel{0}\,1)^{Z2}$ r5    E:    $(1\,1\,1\,1\,1\,1\,1)^{E}$

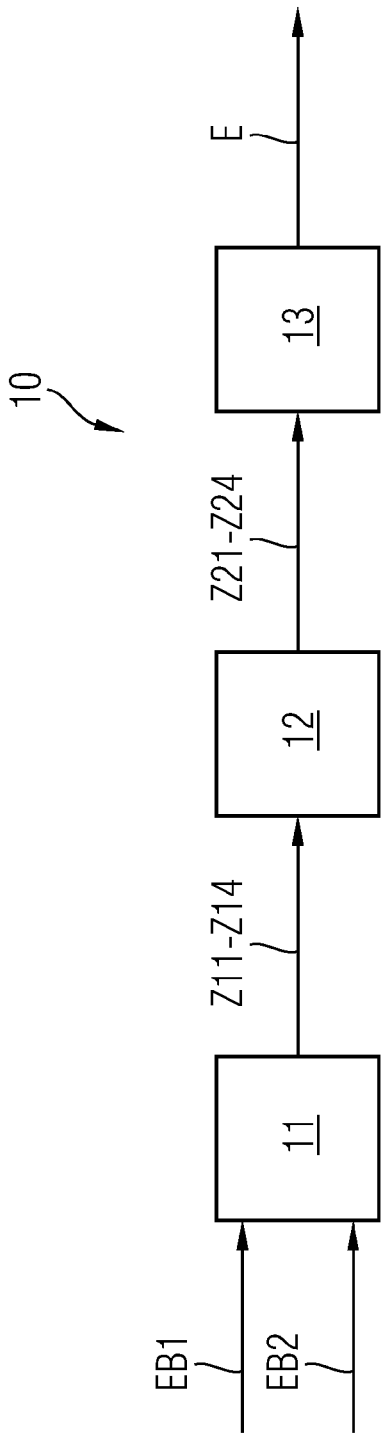

METHOD AND PROCESSOR UNIT FOR IMPLEMENTING A CHARACTERISTIC-2-MULTIPLICATION

CROSS-REFERENCE TO RELATED APPLICATIONS

This application is a U.S. National Stage Application of International Application No. PCT/EP2009/056228 filed May 22, 2009, which designates the United States of America, and claims priority to DE Application No. 10 2008 033 962.8 filed Jul. 21, 2008. The contents of which are hereby incorporated by reference in their entirety.

TECHNICAL FIELD

The invention relates to a method and a processor unit for implementing a characteristic-2-multiplication of at least two input bit strings.

BACKGROUND

The characteristic-2-multiplication is used in a multitude of cryptographic processes, particularly in public key processes, such as—for example—in a hardware-based implementation of cryptographic processes on the basis of elliptic curves. The numbers used in such a characteristic-2-arithmetic may be efficiently represented as bit strings on a processor unit, processor or computer. Such a bit string may be temporarily stored by a register. The addition of two numbers in such a representation corresponds to the bitwise XOR operation of the represented bit strings. A multiplication of two bit strings or operands in the characteristic-2-arithmetic corresponds mathematically to the product of two polynomials from GF(2)[X], wherein the bit strings which are used for representing the numbers correspond to the 0/1-sequence of the coefficients of the respective polynomials.

The mathematical basis for a characteristic-2-multiplication consists in reducing the product of two numbers to a predefined quantity of partial products, which are then added together to produce the result. For example, to multiply the numbers 1011 and 1101 below, the partial products and the sum are applied:

```
      1 0 1 1
      0 0 0 0
    1 0 1 1
  1 0 1 1
  ─────────────
  1 1 1 1 1 1 1
```

To produce the result, the partial products are added together by a column-wise XOR operation. As basic operations for carrying out such a multiplication, shift operations and bitwise AND operations are used for calculating the partial products in the rows of the above table and bitwise XOR operations are used for calculating the respective column total of the partial products.

Known optimized variants of this multiplication process are so-called window methods. In window methods the number of required additions of partial products may be reduced, in particular because a small table of multiples of the one operand is precalculated. With the help of this precalculated table, several bits at once may then be used in each subsequent stage for calculating partial products. The calculation of partial products may consequently be reduced to a lookup in the precalculated table. With optimized parameter selection, the saving in additions of partial products by the processing of several bits at once may be greater than the time and effort needed for the additional precalculation of the table.

Window methods may also be combined efficiently with shift commands. If the processor used for implementation provides efficient shift commands for specific increments, it may be advantageous to add up the partial products in a number of subtotals. For example, using a processor with a bus width of 8 bits and applying a window method with 4-bit wide windows, the interim result in the accumulator between two additions is moved to the left by 4 bits. However, if two different accumulators are used alternately for adding up the partial sums, then the content of the accumulators may be moved by 8 bits in each case. A movement by 1 byte, i.e. 8 bits, may be achieved most efficiently on a conventional processor by copying the data in the memory. It is only in the subsequent step, when the hitherto calculated interim results of the two accumulators are added together, that the content of an accumulator must be moved to the left by 4 bits. With this method it is possible to save a multitude of cost-intensive shift commands during the calculation of a product.

For longer operands, it may be advantageous to use asymptotically faster algorithms for calculating the multiplication, such as—for example—the Karatsuba or Fourier multiplication. The methods described above for multiplication may then be applied to shorter parts of the numbers to be multiplied.

Even though almost all conventional processors or processor units have hardware for rapid integer multiplication of two bit strings in the bus width of the processor unit, none of these conventional processors supports the characteristic-2-multiplications in hardware.

This means that such a multiplication must always be implemented in software and is therefore significantly slower in general than hardware-based integer multiplication.

SUMMARY

According to various embodiment, a characteristic-2-multiplication of at least two bit strings using a processor unit suitable for integer multiplication can be facilitated.

According to an embodiment, a method for implementing a characteristic-2-multiplication of at least two input bit strings (EB1, EB2) each having a number N of bits by means of a processor unit suitable for carrying out an integer multiplication, may comprise the following steps: a) generating at least one sequence (F) of a number K of zero bits, using K ∈ {1, ..., N}, by means of a first transformation of the respective input bit string (EB1, EB2) to at least one predetermined position in the respective input bit string (EB1, EB2) in order to generate at least one first intermediate bit string (Z11-Z14) for the respective input bit string (EB1, EB2); b) linking the at least two first intermediate bit strings (Z11-Z14) by the integer multiplication of the processor unit for generating at least one second intermediate bit string (Z21-Z24); and c) transforming the at least one second intermediate bit string (Z21-Z24) by means of a second transformation for generating a result bit string (E).

According to a further embodiment, the number K of zero bits can be determined by the sequence (F) depending on the number N of bits in the input bit strings (EB1, EB2). According to a further embodiment, step a) can be developed by: masking of the respective input bit string (EB1, EB2) with at least two different masks (M11, M12) by a respective bitwise AND operation of the respective input bit string (EB1, EB2) with the respective mask in order to generate at least two first intermediate bit strings (Z11-Z14) for the respective input bit string (EB1, EB2). According to a further embodiment, the respective sequence (F) with the number K of zero bits in each case may form a mask window in the respective predetermined mask (M11, M12) with a number N of bits, wherein K fulfils the following condition:

$$\left\lfloor \log_2 \left\lceil \frac{N}{K+1} \right\rceil \right\rfloor \leq K.$$

According to a further embodiment, a number M of predetermined, different masks (M11, M12) can be K+1 (M=K+1). According to a further embodiment, the respective m-th mask (M11, M12), using m ∈ {1, . . . , M}, can be formed from at least one part of a periodic pattern consisting of a respective one-bit followed by a respective sequence (F) of K zero bits. According to a further embodiment, the respective (m+1)-th mask (M12, M11) can be formed by a bit movement of the respective m-th mask (M11, M12) by 1 bit. According to a further embodiment, step c) can be developed by—masking each of at least four second intermediate bit strings (Z21-Z24) with the at least two different masks (M21-M24) each having a respective increased length by a bitwise AND operation in order to generate at least four third intermediate bit strings; and—XOR-linking of at least four third intermediate bit strings in order to generate the result bit string (E). According to a further embodiment, step a) can be developed by:—expansion of the respective input bit string (EB1, EB2) by insertion of the sequence (F) of K zero bits between all adjacent N bits of the corresponding input bit string (EB1, EB2) in order to generate a respective first intermediate bit string (Z11-Z14) for each input bit string (EB1, EB2). According to a further embodiment, the respective sequence (F) with the number K of zero bits may form a window in the respective intermediate bit string (Z11-Z14), wherein K fulfils the following condition:

$$\lfloor \log_2(N) \rfloor \leq K.$$

According to a further embodiment, step b) can be developed by:—linking of the two first intermediate bit strings (Z11, Z12) by the integer multiplication of the processor unit in order to generate a single second intermediate bit string (Z2). According to a further embodiment, step c) can be developed by:—extraction of bits of the generated, second intermediate bit strings (Z2) at predefined positions i·(K+1), using i ∈ {0, . . . , 2N−2}, beginning with the lowest-value bit of the second intermediate bit string (Z2) with the position 0 (P1).

According to another embodiment, a computer program product may cause a method as described above to be carried out on a program-controlled device.

According to yet another embodiment, a processor unit (10) for implementation of a characteristic-2-multiplication of at least two input bit strings (EB1, EB2) each having a number N bits, may comprise:—a generation device (11), which is suitable for generating a sequence (F) of a number K of zero bits, using K∈{1, . . . , N}, by means of a first transformation of the respective input bit string (EB1, EB2) to at least one predetermined position in the respective input bit string (EB1, EB2) in order to generate at least one first intermediate bit string (Z11-Z14);—a logical operation device (12), which is suitable for linking the at least two first intermediate bit strings (Z11-Z14) by an integer multiplication in order to generate at least one second intermediate bit string (Z21-Z22); and—a transformation device (13) which is suitable for transforming at least one second intermediate bit string (Z21-Z24) by means of at least one second transformation in order to generate a result bit string (E).

BRIEF DESCRIPTION OF THE DRAWINGS

The invention is described in greater detail below on the basis of the exemplary embodiments shown in the schematic diagrams. In these.

FIG. 6 is a schematic block diagram of an exemplary embodiment of the processor unit for implementing a characteristic-2-multiplication; and FIG. 7 is a schematic example of an integer multiplication of two first intermediate bit strings.

In all diagrams, equivalent or functionally equivalent resources and equipment are provided with the same reference characters, except where otherwise stated.

DETAILED DESCRIPTION

Figure 1:
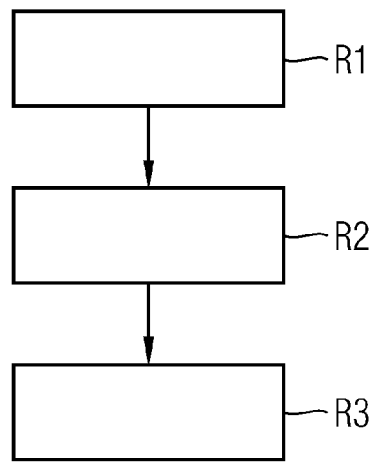
FIG. 1 is a schematic flow chart showing a first exemplary embodiment of the method for implementing a characteristic-2-multiplication.

A method is accordingly proposed for implementing a characteristic-2-multiplication of at least two input bit strings each having a number N of bits by means of a processor unit suitable for carrying out a hardware-based integer multiplication, comprising the following steps:

a) generating at least one sequence of a number K of zero bits, using K∈{1, . . . , N}, by means of a first transformation of the respective input bit string to at least one predetermined position in the respective input bit string for generating at least one first intermediate bit string for each input bit string;

b) linking the at least two first intermediate bit strings by means of the hardware-based integer multiplication of the processor unit for generating at least one second intermediate bit string; and c) transforming the at least one second intermediate bit string by means of a second transformation for generating a result bit string.

A processor unit for implementing a characteristic-2-multiplication of at least two input bit strings each having a number N bits is also proposed, which has:

a generation device, which is suitable for generating a sequence of a number K of zero bits, using K∈{1, . . . , N}, by means of a first transformation of the respective input bit string to at least one predetermined position in the respective input bit string for generating at least one first intermediate bit string;

a logical operation device, which is suitable for linking at least two first intermediate bit strings by means of a hardware-based integer multiplication in order to generate at least one second intermediate bit string; and a transformation device, which is suitable for transforming the at least one second intermediate bit string by means of at least one second transformation in order to generate a result bit string.

An advantage of the various embodiments is that a characteristic-2-multiplication of two bit strings, input bit strings or numbers by means of a conventional processor or a conventional processor unit which is suitable only for hardware-based integer multiplication, is made possible.

The characteristic-2-multiplication and the conventional integer multiplication differ in particular in the way in which the calculated partial products are added together. While a column-wise XOR operation is used in the characteristic-2-multiplication, which corresponds to a total without carry-overs, in conventional integer multiplication the column totals are calculated with carry-overs. However, these carry-overs can conventionally also affect and modify the column totals of adjacent columns.

According to various embodiments, therefore, blanks are artificially inserted into the numbers to be multiplied by means of the sequence of the number K of zero bits, in which the carry-overs necessarily produced in conventional integer multiplication can be gathered together. The carry-overs produced in this way therefore can no longer modify or affect the column totals situated further left.

As mentioned above, the carry-overs necessarily produced in conventional integer multiplication according to process step b) can be gathered together without potentially falsifying other aggregate bits for the characteristic-2-multiplication. Many conventional processors have hardware for carrying out an integer multiplication rapidly and efficiently. An individual assembler command is conventionally necessary for this purpose.

The method according to various embodiments for the characteristic-2-multiplication may be executed during the execution of such a multiplication command. This means that the individual assembler command may affect the calculation and addition of partial products including the shift operations necessary for this purpose. In contrast, such a rapid and efficient implementation cannot generally be achieved in a software-implemented algorithm for characteristic-2-multiplication, as that already provided by the hardware of the processor unit.

The various embodiments are therefore particularly advantageous if the processor unit used provides only bitwise shifting or the provided shift commands have long execution times.

According to an embodiment, the number K of zero bits in the sequence is determined depending on the number N of bits in the input bit strings.

According to a further embodiment, step a) of the method described above is developed by a masking of the respective input bit string with at least two different masks by a respective bitwise AND operation of the respective input bit string with the respective mask for generating at least two first intermediate bit strings.

According to a further embodiment, the respective sequence with the number K of zero bits generates in each case a mask window in the respective predefined mask with a number N of bits, wherein K fulfils the following condition:

$$\left\lfloor \log_2\left\lceil \frac{N}{K+1} \right\rceil \right\rfloor \leq K$$

According to a further embodiment, a number M of predefined, different masks is equal to K+1 (M=K+1).

According to a further embodiment, the respective m-th mask, using m ∈ {1, . . . , M}, is formed from at least one part of a periodic pattern consisting of a respective one-bit followed by a respective sequence of K zero bits.

According to a further embodiment, the respective (m+1)-th mask is formed by a bit movement of the respective m-th mask by 1 bit.

According to a further embodiment, stage c) of the method described above is developed by:
masking each of at least four second intermediate bit strings with the at least two different masks each having a doubled length through a bitwise AND-operation in order to generate at least four third intermediate bit strings; and
XOR-operation of the at least four third intermediate bit strings in order to generate the result bit string.

According to an embodiment, step a) of the method described above is developed by an expansion of the respective input bit string by insertion of the sequence of K zero bits between all N bits of the corresponding input bit string (N−1 times in total) in order to generate a respective intermediate bit string for each input bit string.

According to a further embodiment, the respective sequence with the number K of zero bits forms a window in the respective first intermediate bit string, wherein K fulfils the following condition:

$$\lfloor \log_2(N) \rfloor \leq K$$

According to a further embodiment, step b) of the method described above is developed by a linking of the two first intermediate bit strings by the integer multiplication of the processor unit in order to generate a single second intermediate bit string.

According to a further embodiment, step c) is developed by:
extraction of bits from the generated, second bit string at predefined positions i·(K+1), using i ∈ {0, . . . , 2N−2}, beginning with the lowest-value bit of the second intermediate bit string with the position 0.

A computer program product is further proposed, which causes an process such as the one described above to be carried out on a program-controlled device.

A computer program product, such as a computer program resource, may be provided or supplied—for example—in the form of a storage medium, such as a memory card, USB stick, floppy disk, CD stick, CD-ROM, DVD or even in the form of a downloadable file from a server in a network. This may be done in a wireless communication network, for example, by transferring a corresponding file with the computer program product or computer program resource.

FIG. 1 shows a schematic flow chart of a first exemplary embodiment for implementing a characteristic-2-multiplication of at least two input bit strings EB1, EB2 each having a number N of bits by means of a processor unit 10 suitable for carrying out an integer multiplication.

The method according to various embodiments is described below on the basis of the block diagram in FIG. 1 with reference to the examples in FIG. 3 and FIG. 5.

Figure 3:
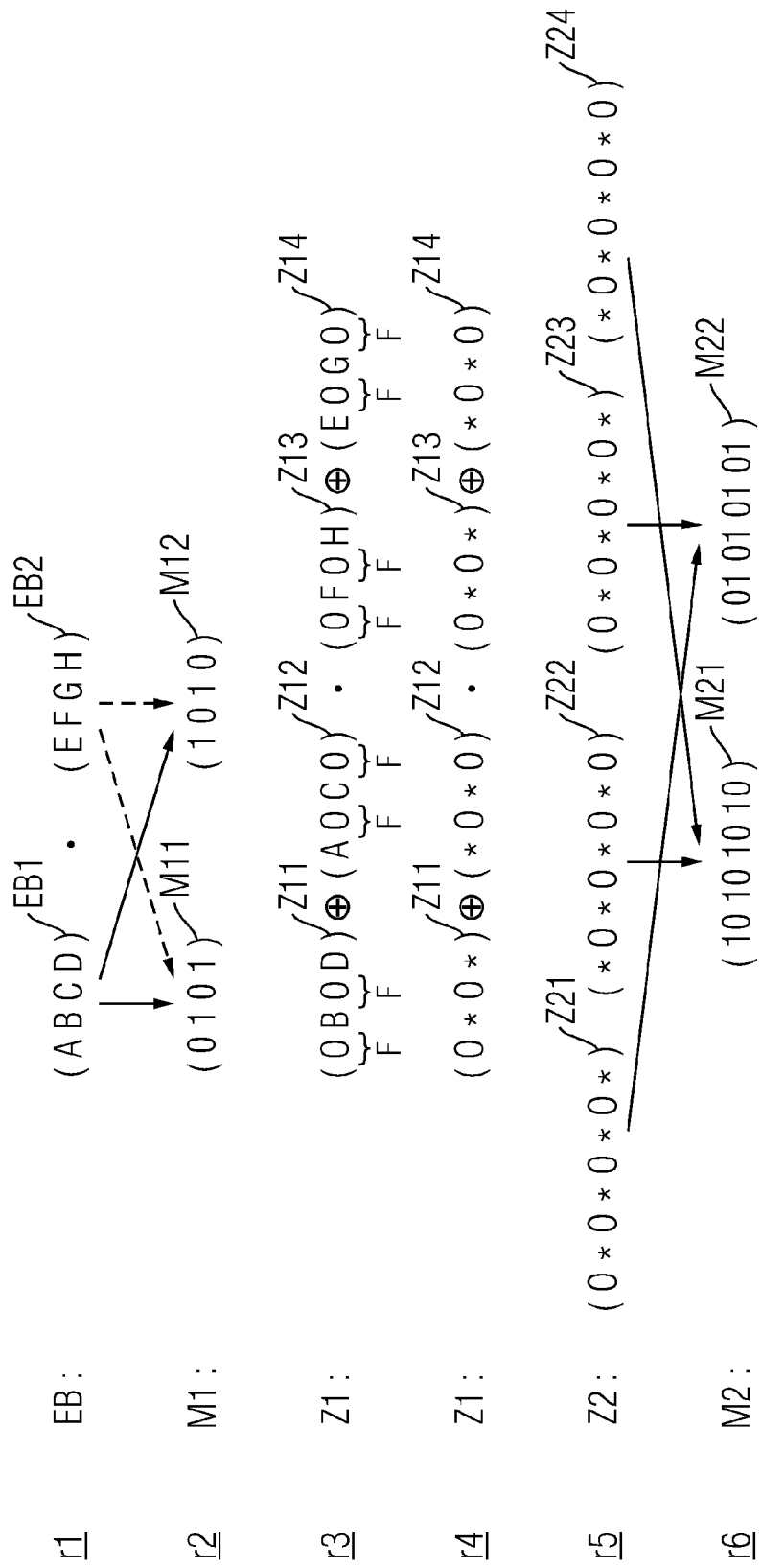
FIG. 3 is a schematic example of an application of the second exemplary embodiment of the method according to FIG. 2.
Figures 4, 5:
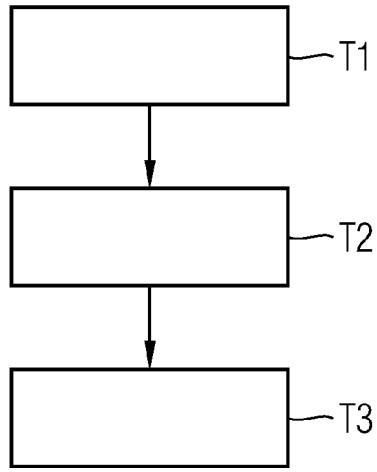
FIG. 4 is a schematic flow chart of a third exemplary embodiment of the method for implementing a characteristic-2-multiplication.
FIG. 5 is a schematic example of an application of the third exemplary embodiment of the method according to FIG. 4.

In FIGS. 3 and 5 the reference character EB$i$ using i ∈ {1,2} indicates the respective i-th input bit string EB1, EB2. M1$i$ further indicates the respective first mask M11, M12. M2$i$ further indicates the respective second mask M21, M22. Z1$j$ with j ∈ {1,2,3,4} further indicates the respective first intermediate bit string Z11, Z12, Z13 and Z14. Furthermore, Z2$j$ indicates the respective second intermediate bit string Z21, Z22, Z23, Z24. E indicates the result bit string, and the reference characters r1-r6 each indicate a row in FIGS. 3 and 5 for ease of reference in these diagrams.

The method according to various embodiments according to FIG. 1 shows the process steps R1 to R3:

Process Step R1:

At least one sequence F of a number K of zero bits, using K $\in \{1, \ldots, N\}$, is generated by means of a first transformation of the respective input bit string EB1, EB2 to at least one predetermined position in the respective input bit string EB1, EB2 in order to generate at least one first intermediate bit string Z11-Z14, wherein the number K of zero bits in the sequence F is preferably determined depending on the number N of bits in the input bit strings EB1, EB2.

Process Step R2:

The at least two first intermediate bit strings Z11-Z14 are logically linked by the hardware-based integer multiplication by the processor unit 10 in order to generate at least one second intermediate bit string Z21-Z24.

Process Step R3:

By means of a second predefined transformation, the at least one second intermediate bit string Z21-Z24 is transformed in order to generate a result bit string E.

Figure 2:
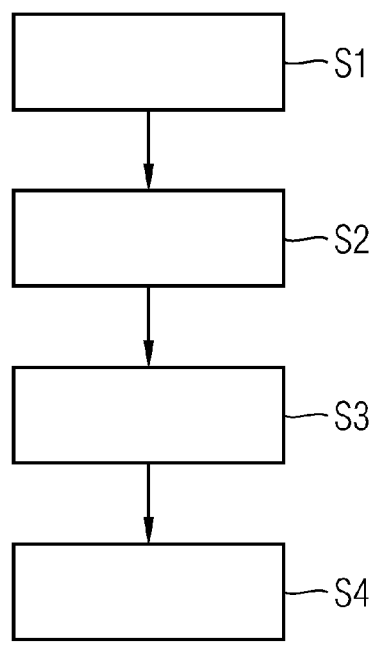
FIG. 2 is a schematic flow chart showing a second exemplary embodiment of the method for implementing a characteristic-2-multiplication.

FIG. 2 shows a schematic flow chart of a second exemplary embodiment of the method for implementing a characteristic-2-multiplication of at least two input bit strings EB1, EB2 each having a number N of bits by means of a processor unit 10 suitable for carrying out an integer multiplication.

The second exemplary embodiment according to FIG. 2 shows the following process steps S1-S4:

Process Step S1:

The respective input bit string EB1, EB2 of the at least two input bit strings EB1, EB2 is masked with at least two different masks M11, M12 by a respective bitwise AND operation of the respective input bit string EB1, EB2 with the respective masks M11, M12 in order to generate at least two first intermediate bit strings Z11-Z14. Thus the first transformation illustrated according to FIG. 1 with reference to process step R1 is designed as a masking according to FIG. 2, wherein the respective sequence F with the number K of zero bits in each case forms a mask window in the respective predefined masks M11, M12 with a number N of bits, in which K fulfils the following condition:

$$\left\lfloor \log_2\left\lceil \frac{N}{K+1} \right\rceil \right\rfloor \leq K$$

The number M of predefined, different masks M11, M12 is preferably equal to K+1 (M=K+1).

The respective m-th mask M11, M12, using $m \in \{1, \ldots, N\}$, is formed from at least one part of a periodic pattern consisting of a respective one-bit and followed by a respective sequence F of K zero bits. For this purpose FIG. 3 shows a schematic example of an application of the second exemplary embodiment of the method according to FIG. 2, wherein the row r1 shows two input bit strings EB1, EB2 in which EB1="ABCD" and EB2="EFGH". The row r2 further shows two masks M11 and M12 in which M11="0101" and M12="1010". According to the example of row r2 in FIG. 3, K=1 and M=2. The example also shows that the respective (m+1)-th mask M12, M11 is formed by a bit movement of the respective m-th masks M11, M12 by one bit.

Furthermore, the row r3 shows the first intermediate bit strings Z11-Z14, which represent the result of a masking of the input bit strings EB1, EB2 with the masks M11, M12. The row r4 further shows an abstract representation of the row r3, wherein the hexadecimal numbers A-H of the row r3 are each replaced by an abstraction "*", which indicates only that the respective value may be nonzero.

Process Step S2:

The four second intermediate bit strings Z21-Z24 according to row r5 are produced from a logical operation of the first intermediate bit strings Z11-Z14 according to row r4 by means of the integer multiplication of the processor unit 10. For this purpose the products Z11*Z13, Z11*Z14, Z12*Z13 and Z12*Z14 are calculated by means of the integer multiplication of the processor unit 10. The results of this calculation step form the second intermediate bit string Z21-Z24.

Process Step S3:

The four second intermediate bit strings Z21-Z24 are further masked with the two different masks M21, M22 according to row r6 by a bitwise AND operation in order to generate at least four third intermediate bit strings (not shown).

Process Step S4:

Furthermore, the at least four fourth intermediate bit strings are further XOR linked bitwise in order to generate the result bit string E.

FIG. 4 shows a schematic flow chart of a third exemplary embodiment of the method for implementing a characteristic-2-multiplication of at least two input bit strings EB1, EB2 each having a number N of bits by means of a processor unit suitable for carrying out an integer multiplication.

The exemplary embodiment according to FIG. 4 shows the process steps T1-T3:

Process Step T1:

The respective input bit string EB1, EB2 is expanded by the insertion of a sequence F of a number K of zero bits between all adjacent bits of the corresponding input bit string EB1, EB2 (N−1 times in total) in order to generate a respective first intermediate bit string Z11, Z12 for each input bit string EB1, EB2. For this purpose FIG. 5 shows two different input bit strings EB1, EB2 in row r1, and row r2 shows the respective input bit strings EB1, EB2 expanded with the sequence F in order to generate the corresponding first intermediate bit strings Z11, Z12. Thus the left-hand first intermediate bit string Z11 is produced from the expansion of the first input bit string EB1 and the right-hand first intermediate bit string Z12 is produced from the expansion of the second input bit string EB2.

As shown in row r2 of FIG. 5, the respective sequence F with the number K of zero bits forms a window in the respective first intermediate bit string Z11, Z12.

The number K of zero bits of a respective sequence F further satisfies the following condition:

$$\lfloor \log_2(N) \rfloor \leq K$$

Process Step T2:

The two first intermediate bit strings Z11, Z12 according to row r2 of FIG. 5 are logically linked by the integer multiplication by the processor unit 10 in order to generate a single second intermediate bit string Z2 according to row r3.

Process Step T3:

Bits of the generated second intermediate bit string Z2 (see row r4) are extracted at the predefined positions i·(K+1), using $i \in \{0, \ldots, 2N-2\}$, beginning with the lowest-value bit of the second intermediate bit string Z2 with the position 0. This extraction produces the result bit string E according to row r5 in FIG. 5.

FIG. 6 shows a schematic block diagram of an exemplary embodiment of the processor unit 10 for implementing a characteristic-2-multiplication of at least two input bit strings EB1, EB2 each having a number N of bits.

For this purpose the processor unit 10 has a generation device 11, a logical operation device 12 and a transformation device 13.

The generation device 11 is suitable for generating a sequence F of a number K of zero bits, using K ∈ {1, ..., N}, by means of a first transformation of the respective input bit string EB1, EB2 to at least one predetermined position in the respective input bit string EB1, EB2 in order to generate at least one first intermediate bit string Z11-Z12.

The logical operation device 12 is further equipped for linking at least two first intermediate bit strings Z11-Z12 by an integer multiplication in order to generate at least one second intermediate bit string Z21.

Furthermore, the transformation device 13 is equipped for transforming the at least one second intermediate bit string Z21 by means of at least one second transformation in order to generate a result bit string E.

FIG. 7 further shows a schematic example of an integer multiplication of two first intermediate bit strings. For example, these two first intermediate bit strings may be represented by the bit pattern "ABCD" and "EFGH". In the first step these first intermediate bit strings are masked with the masks "0101" and "1010", i.e. linked bitwise with an AND operation. This produces the four bit patterns or numbers "0B0D", "A0C0", "0F0H" and "E0G0". All bit patterns produced from "ABCD" are then multiplied with all bit patterns produced from "EFGH" using conventional integer multiplication. This multiplication is shown for the patterns "0B0D" and "0F0H" in FIG. 7 by way of example.

As a result of the masking, the entries that are different from zero in the table of partial products according to FIG. 7 necessarily form a regular grid of rows and columns with one-bit blanks between the entries. The carry-overs which may result from the addition of the column totals using the integer multiplication may therefore be inserted precisely in these artificially formed blanks in the masked numbers. In the example according to FIG. 7, this possible carry-over "BH AND DF" is shown as a "*". If the result is now linked bitwise by an AND operation with the mask "1010101", these carry-overs then drop out (as indicated in FIG. 3) and a part of the result of the required characteristic-2-multiplication is received. The three remaining products between the different masked numbers deliver the remaining values and are calculated by means of suitably adapted bit masks. A bitwise XOR operation of the four values calculated in this way delivers the result of the characteristic-2-multiplication.

Overall the various embodiments use only bitwise AND operations for masking the numbers and for masking the partial products, the conventional integer multiplication by the processor unit and a bitwise XOR operation for adding together the different partial results. In particular, shift commands are no longer necessary according to various embodiments. These are executed implicitly by the integer multiplication.

The exact choice of masks for implementing various embodiments depends on the length (number N of bits) of the numbers or input bit strings to be multiplied. The following table shows the widths of the windows in the masks in bits and the number of necessary integer multiplications for various bit lengths N of the input bit strings EB1, EB2 or numbers to be multiplied:

| Bit lengths of numbers | Bit lengths of mask windows | Number of integer multiplications |
| --- | --- | --- |
| 4 | 1 | 4 |
| 8 | 2 | 9 |
| 16 | 2 | 9 |
| 32 | 3 | 16 |

An exemplary embodiment of an implementation of a characteristic-2-multiplication for a 32-bit Intel Pentium 4 or AMD Athlon processor with SSE2 unit is described below. These processors have eight registers with a length of 128 bits, designated xmm0-xmm7, wherein assembler commands pand and pxor exist for a bitwise AND and XOR operation of two registers or of one register with a memory content. In addition, these processors have a command pmuludq, which carries out two integer multiplications in parallel each with 32-bit operands and 64-bit result. These commands are used for generating the following assembler routine for the characteristic-2-multiplication of 64-bit numbers with 128-bit result. The assembler routine shown below may be translated with the nasm assembler and is executable under the GCC compiler. Four different masks are used and the bit length of the mask window is 3:

```
; Assembler routine for multiplications via GF(2): 64×64->128
[SECTION .text]
; void mul64(uint32_t c[ ], uint32_t a[ ], uint32_t b[ ])
; c <- a*b
global _mul64
_mul64:
        ; precalculate masked values of 2nd operand in xmm4 to xmm7
        mov eax, [esp+12]        ; address of 2nd operand
        movq xmm4, [eax]         ; xmm4 = (0, 0, X, Y)
        pshufd xmm4, xmm4, 0x98  ; xmm4 = (0, X, 0, Y)
        movdqa xmm5, xmm4
        pand xmm4, [mask1]
        movdqa xmm6, xmm5
        pand xmm5, [mask2]
        movdqa xmm7, xmm6
        pand xmm6, [mask3]
        pand xmm7, [mask4]
        ; load first block of 1st operand
        mov eax, [esp+8]         ; address of 1st operand
        movd xmm0, [eax]         ; xmm0 = (0, 0, 0, X)
        punpcklqdq xmm0, xmm0    ; xmm0 = (0, X, 0, X)
        movdqa xmm1, xmm0
        pand xmm1, [mask1]
        movdqa xmm2, xmm1
        pmuludq xmm2, xmm4       ; mask1 * mask 1
```

```
        pand xmm2, [mask1]
        movdqa xmm3, xmm1
        pmuludq xmm3, xmm5      ; mask1 * mask 2
        pand xmm3, [mask2]
        pxor xmm2, xmm3
        movdqa xmm3, xmm1
        pmuludq xmm3, xmm6      ; mask1 * mask 3
        pand xmm3, [mask3]
        pxor xmm2, xmm3
        pmuludq xmm1, xmm7      ; mask1 * mask 4
        pand xmm1, [mask4]
        pxor xmm2, xmm1
        movdqa xmm1, xmm0
        pand xmm1, [mask2]
        movdqa xmm3, xmm1
        pmuludq xmm3, xmm4      ; mask2 * mask 1
        pand xmm3, [mask2]
        pxor xmm2, xmm3
        movdqa xmm3, xmm1
        pmuludq xmm3, xmm5      ; mask2 * mask 2
        pand xmm3, [mask3]
        pxor xmm2, xmm3
        movdqa xmm3, xmm1
        pmuludq xmm3, xmm6      ; mask2 * mask 3
        pand xmm3, [mask4]
        pxor xmm2, xmm3
        pmuludq xmm1, xmm7      ; mask2 * mask 4
        pand xmm1, [mask1]
        pxor xmm2, xmm1
        movdqa xmm1, xmm0
        pand xmm1, [mask3]
        movdqa xmm3, xmm1
        pmuludq xmm3, xmm4      ; mask3 * mask 1
        pand xmm3, [mask3]
        pxor xmm2, xmm3
        movdqa xmm3, xmm1
        pmuludq xmm3, xmm5      ; mask3 * mask 2
        pand xmm3, [mask4]
        pxor xmm2, xmm3
        movdqa xmm3, xmm1
        pmuludq xmm3, xmm6      ; mask3 * mask 3
        pand xmm3, [mask1]
        pxor xmm2, xmm3
        pmuludq xmm1, xmm7      ; mask3 * mask 4
        pand xmm1, [mask2]
        pxor xmm2, xmm1
        pand xmm0, [mask4]
        movdqa xmm3, xmm0
        pmuludq xmm3, xmm4      ; mask4 * mask 1
        pand xmm3, [mask4]
        pxor xmm2, xmm3
        movdqa xmm3, xmm0
        pmuludq xmm3, xmm5      ; mask4 * mask 2
        pand xmm3, [mask1]
        pxor xmm2, xmm3
        movdqa xmm3, xmm0
        pmuludq xmm3, xmm6      ; mask4 * mask 3
        pand xmm3, [mask2]
        pxor xmm2, xmm3
        pmuludq xmm0, xmm7      ; mask4 * mask 4
        pand xmm0, [mask3]
        pxor xmm2, xmm0
        pxor xmm3, xmm3         ; erase xmm3
        movq xmm3, xmm2         ; copy bottom 64 bits from xmm2 to xmm3
        pxor xmm2, xmm3         ; erase bottom 64 bits from xmm2
        pshufd xmm2, xmm2, 0x38 ; Permutation 0, 3, 2, 0
        pxor xmm2, xmm3
        movdqa [tmp], xmm2      ; buffer temporarily
        ; load second block of 1st operand
        movd xmm0, [eax+4]      ; xmm0 = (0, 0, 0, Y)
        punpcklqdq xmm0, xmm0   ; xmm0 = (0, Y, 0, Y)
        movdqa xmm1, xmm0
        pand xmm1, [mask1]
        movdqa xmm2, xmm1
        pmuludq xmm2, xmm4      ; mask1 * mask 1
        pand xmm2, [mask1]
        movdqa xmm3, xmm1
```

```
        pmuludq xmm3, xmm5       ; mask1 * mask 2
        pand xmm3, [mask2]
        pxor xmm2, xmm3
        movdqa xmm3, xmm1
        pmuludq xmm3, xmm6       ; mask1 * mask 3
        pand xmm3, [mask3]
        pxor xmm2, xmm3
        pmuludq xmm1, xmm7       ; mask1 * mask 4
        pand xmm1, [mask4]
        pxor xmm2, xmm1
        movdqa xmm1, xmm0
        pand xmm1, [mask2]
        movdqa xmm3, xmm1
        pmuludq xmm3, xmm4       ; mask2 * mask 1
        pand xmm3, [mask2]
        pxor xmm2, xmm3
        movdqa xmm3, xmm1
        pmuludq xmm3, xmm5       ; mask2 * mask 2
        pand xmm3, [mask3]
        pxor xmm2, xmm3
        movdqa xmm3, xmm1
        pmuludq xmm3, xmm6       ; mask2 * mask 3
        pand xmm3, [mask4]
        pxor xmm2, xmm3
        pmuludq xmm1, xmm7       ; mask2 * mask 4
        pand xmm1, [mask1]
        pxor xmm2, xmm1
        movdqa xmm1, xmm0
        pand xmm1, [mask3]
        movdqa xmm3, xmm1
        pmuludq xmm3, xmm4       ; mask3 * mask 1
        pand xmm3, [mask3]
        pxor xmm2, xmm3
        movdqa xmm3, xmm1
        pmuludq xmm3, xmm5       ; mask3 * mask 2
        pand xmm3, [mask4]
        pxor xmm2, xmm3
        movdqa xmm3, xmm1
        pmuludq xmm3, xmm6       ; mask3 * mask 3
        pand xmm3, [mask1]
        pxor xmm2, xmm3
        pmuludq xmm1, xmm7       ; mask3 * mask 4
        pand xmm1, [mask2]
        pxor xmm2, xmm1
        pand xmm0, [mask4]
        pmuludq xmm4, xmm0       ; mask4 * mask 1
        pand xmm4, [mask4]
        pxor xmm2, xmm4
        pmuludq xmm5, xmm0       ; mask4 * mask 2
        pand xmm5, [mask1]
        pxor xmm2, xmm5
        pmuludq xmm6, xmm0       ; mask4 * mask 3
        pand xmm6, [mask2]
        pxor xmm2, xmm6
        pmuludq xmm7, xmm0       ; mask4 * mask 4
        pand xmm7, [mask3]
        pxor xmm2, xmm7
        pxor xmm3, xmm3          ; erase xmm3
        movq xmm3, xmm2          ; copy bottom 64 bits from xmm2 to xmm3
        pxor xmm2, xmm3          ; erase bottom 64 bits from xmm2
        pshufd xmm3, xmm3, 0xd3  ; Permutation 3, 1, 0, 3
        pxor xmm2, xmm3
        pxor xmm2, [tmp]
        mov eax, [esp+4]         ; address of target variables
        movdqu [eax], xmm2
        ret
[SECTION .data]
        align 16
mask1   dd 0x11111111, 0x11111111, 0x11111111, 0x11111111
mask2   dd 0x22222222, 0x22222222, 0x22222222, 0x22222222
mask3   dd 0x44444444, 0x44444444, 0x44444444, 0x44444444
mask4   dd 0x88888888, 0x88888888, 0x88888888, 0x88888888
[SECTION .bss]
        align 16
tmp     resb 16
```

Even though this invention has been described on the basis of exemplary embodiments, it is not limited to these but may be modified in a variety of ways and means.

What is claimed is:

1. A method for implementing a characteristic-2-multiplication of at least two input bit strings each having a number N of bits by means of a processor unit suitable for carrying out an integer multiplication, comprising the following steps:
    a) masking of the respective input bit string with at least two different masks by a respective bitwise AND operation of the respective input bit string with the respective mask in order to generate at least two first intermediate bit strings for the respective input bit string, wherein the respective first intermediate bit string has no adjacent one-bits;
    b) linking the at least two first intermediate bit strings by the integer multiplication of the processor unit for generating at least one second intermediate bit string; and
    c) transforming the at least one second intermediate bit string by means of a second transformation for generating a result bit string;
    wherein the respective sequence with a number K of zero bits in each case forms a mask window in the respective predetermined mask with a number N of bits, wherein K fulfills the following condition:

$$\left\lfloor \log_2 \left\lceil \frac{N}{K+1} \right\rceil \right\rfloor \leq K.$$

2. The method as claimed in claim 1, wherein a number M of predetermined, different masks is K+1.

3. The method as claimed in claim 2, wherein the respective m-th mask, using m∈{1, ..., M}, is formed from a periodic pattern consisting of a respective one-bit followed by a respective sequence of K zero bits.

4. The method as claimed in claim 3, wherein the respective (m+1)-th mask is formed by a bit movement of the respective m-th mask by 1 bit.

5. The method as claimed in claim 1, wherein step c) is developed by:
    masking each of at least four second intermediate bit strings with the at least two different masks each having a respective increased length by a bitwise AND operation in order to generate at least four third intermediate bit strings; and
    XOR-linking of at least four third intermediate bit strings in order to generate the result bit string.

6. A computer program product comprising a non-transitory computer readable medium storing an instruction code which when executed on a program controlled device performs the steps of:
    a) masking of the respective input bit string with at least two different masks by a respective bitwise AND operation of the respective input bit string with the respective mask in order to generate at least two first intermediate bit strings for the respective input bit string, wherein the respective first intermediate bit string has no adjacent one-bits;
    b) linking the at least two first intermediate bit strings by the integer multiplication of the processor unit for generating at least one second intermediate bit string; and
    c) transforming the at least one second intermediate bit string by means of a second transformation for generating a result bit string;
    wherein the respective sequence with a number K of zero bits in each case forms a mask window in the respective predetermined mask with a number N of bits, wherein K fulfils the following condition:

$$\left\lfloor \log_2 \left\lceil \frac{N}{K+1} \right\rceil \right\rfloor \leq K.$$

7. The computer program product as claimed in claim 6, wherein a number M of predetermined, different masks is K+1.

8. The computer program product as claimed in claim 6, wherein the respective m-th mask, using m∈{1, ..., M}, is formed from a periodic pattern consisting of a respective one-bit followed by a respective sequence of K zero bits.

9. A processor unit for implementation of a characteristic-2-multiplication of at least two input bit strings each having a number N bits, comprising:
    a generation device, which is operable to mask the respective input bit string with at least two different masks by a respective bitwise AND operation of the respective input bit string with the respective mask in order to generate at least two first intermediate bit strings for the respective input bit string, wherein the respective first intermediate bit string has no adjacent one-bits;
    a logical operation device, which is operable to link the at least two first intermediate bit strings by an integer multiplication in order to generate at least one second intermediate bit string; and
    a transformation device which is operable to transform at least one second intermediate bit string by means of at least one second transformation in order to generate a result bit string;
    wherein the respective sequence with a number K of zero bits in each case forms a mask window in the respective predetermined mask with a number N of bits, wherein K fulfils the following condition:

$$\left\lfloor \log_2 \left\lceil \frac{N}{K+1} \right\rceil \right\rfloor \leq K.$$

10. The processor unit as claimed in claim 9, wherein a number M of predetermined, different masks is K+1.

11. The processor unit as claimed in claim 9, wherein the respective m-th mask, using m∈{1, ..., M}, is formed from a periodic pattern consisting of a respective one-bit followed by a respective sequence of K zero bits.

12. The processor unit as claimed in claim 11, wherein the respective (m+1)-th mask is formed by a bit movement of the respective m-th mask by 1 bit.

13. The processor unit as claimed in claim 9, wherein step c) is developed by:
    masking each of at least four second intermediate bit strings with the at least two different masks each having a respective increased length by a bitwise AND operation in order to generate at least four third intermediate bit strings; and
    XOR-linking of at least four third intermediate bit strings in order to generate the result bit string.

* * * * *